United States Patent

[11] 3,581,131

[72] Inventor Cestmir Richter
Nachod, Czechoslovakia
[21] Appl. No. 881,491
[22] Filed Dec. 2, 1969
[45] Patented May 25, 1971
[73] Assignee Mez Nachod, Narodni podnik
Nachod, Czechoslovakia
[32] Priority Dec. 11, 1968
[33] Czechoslovakia
[31] PV8425/61

[54] SMALL ELECTRIC MOTORS FOR DENTAL EQUIPMENT OR THE LIKE
8 Claims, 5 Drawing Figs.

[52] U.S. Cl. ............................................. 310/58
[51] Int. Cl. ............................................. H02k 9/10
[50] Field of Search ............................... 310/54—65

[56] References Cited
UNITED STATES PATENTS
2,661,146 12/1953 Hill et al. ............... 310/58X
2,776,385 1/1957 Modrey ................... 310/58X
2,887,593 5/1959 Wiedemann ............. 310/58

*Primary Examiner*—D. F. Duggan
*Attorney*—Arthur O. Klein

ABSTRACT: A relatively small electric motor adapted to be used for operating dental equipment or the like. The motor includes a rotor and a stator, situated in a motor housing which is formed at its exterior with an inlet passage extending forwardly for directing cooling air to the front of the rotor and stator to flow rearwardly through the gap therebetween. The housing is also formed with an outlet passage having a front end communicating only with the rear of this gap and with the outer atmosphere. In this way cooling air can enter from the rear of the housing into the inlet passage to flow therealong to the front where the cooling air reverses its direction of flow so as to travel rearwardly through the gap between the rotor and stator to be received in the outlet passage so as to discharge back to the outer atmosphere.

PATENTED MAY 25 1971 3,581,131
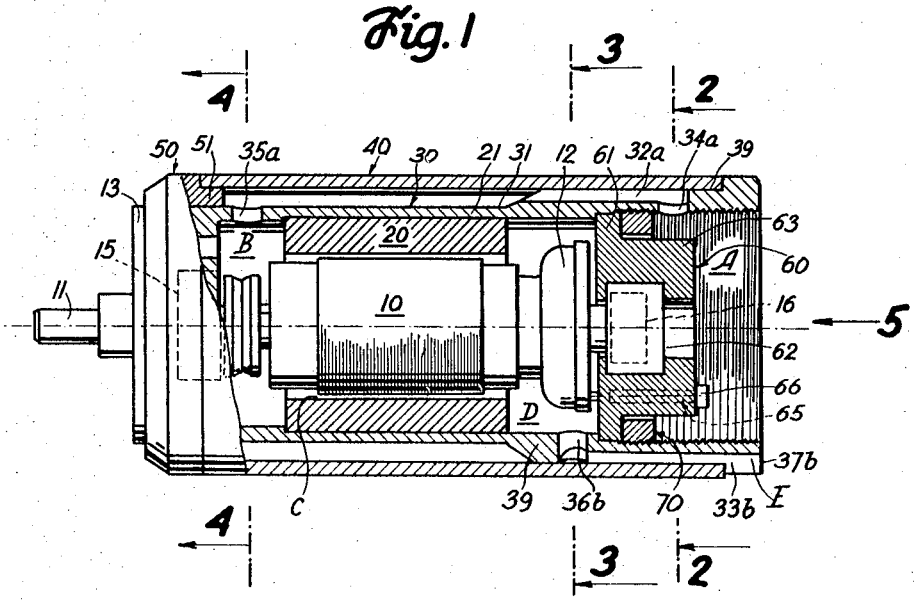
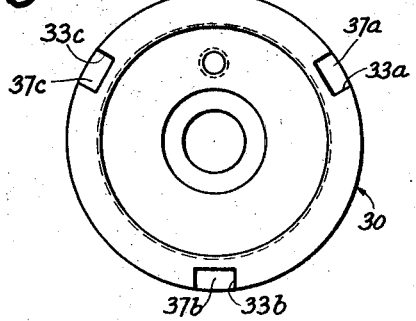
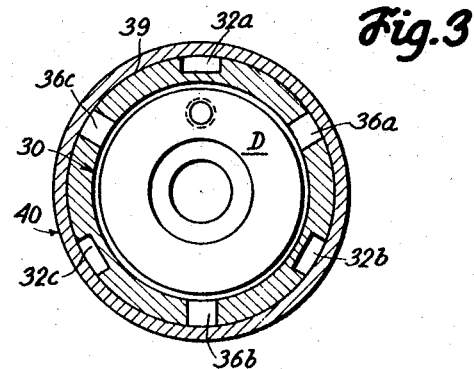
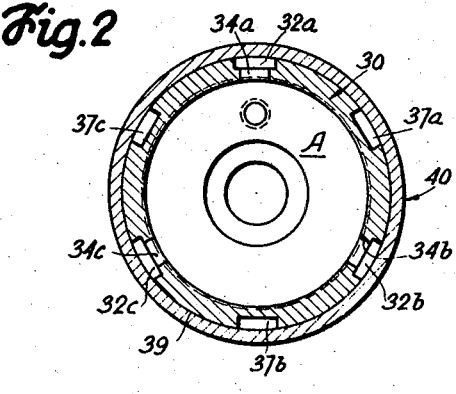
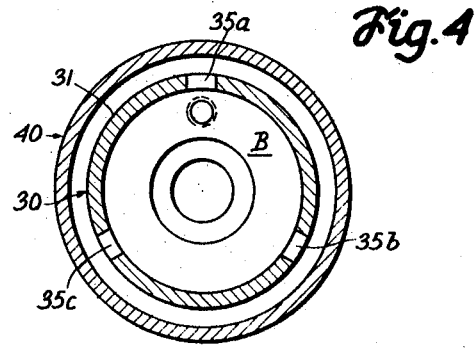
INVENTOR:
CESTMIR RICHTER
BY: *Arthur O. Klein*
ATTORNEY

SMALL ELECTRIC MOTORS FOR DENTAL EQUIPMENT OR THE LIKE

BACKGROUND OF THE INVENTION

The present invention relates to electric motors.

In particular, the present invention relates to relatively small electric motors of the type which are suitable for operating dental equipment or the like.

In particular, the present invention relates to structure for cooling such motors.

There are known drilling machines used for dental purposes where compressed air is directed between the rotor and stator of a driving motor through a hose connected to a rear part of the machine with the driving motor built into a holder of the machine. This compressed air escapes out of the rotor chamber of the motor through discharge openings at the front end of the motor which is directed toward the holder.

With such a construction there is a considerable heating of the motor housing at the holder of the machine since the temperature of the compressed air flowing through the gap between the rotor and stator, particularly in the vicinity of the front region of the motor, is relatively high. Moreover, the hand of the dentist receives the full thrust of particles of foreign matter carried along in the stream of the compressed air, particularly bits of the carbon brushes of the motor, so that the skin of the dentist is seriously irritated and the operations are undesirably disturbed.

Another type of known driving arrangement for dental drilling machines cooled by compressed air is provided with an electric motor having a gap defined between the stator and the housing, the compressed air flowing through this latter gap from the front end of the motor to discharge openings at the rear end of the motor housing. In this way the heat transfer from the stator to the motor housing and in addition to the hand of the dentist is intended to be reduced. However, since no compressed air flows through the rotor chamber with this construction, the greatest part of the heat which is generated radiates out of the rotor chamber, and the temperature is capable of rising undesirably at this location in the event that the motor is overloaded. Moreover, at the region of the connection between the motor and the drill holder driven thereby the compressed air which is guided to this region provides a considerable disturbance in the work of the dentist.

Finally, there are known drill holders of the above type where a free air gap is provided not only between the rotor and stator but also between the stator and motor housing, with both of these air gaps communicating with each other at the front end of the motor through an air chamber. The compressed air which is guided into the holder through the compressed air inlet at the rear end of the motor is blown through a nozzle into the air gap between the rotor and stator and is reversed in the air chamber at the front end of the motor housing so as to flow then through the air gap between the stator and motor housing to discharge openings formed in the motor housing and situated in part at the rear end of the motor.

Since the compressed air flowing along the interior of the motor housing takes up a substantial amount of heat in the air gap between the rotor and stator, the motor housing with this construction also heats up the drill holder to a relatively great extent.

There are also known small electric motors where the front part of the motor is connected to the driven unit (for example, a tooth-drilling assembly) while cooling air is directed into the rear chamber of the motor. The motor housing in this case is surrounded by a sleeve, so that between the sleeve and the housing passages are formed through which the cooling air can flow toward the driven equipment. In this way the sleeve is cooled in its interior while the motor housing is cooled at its exterior, and the cooling air reaches the front chamber of the motor. Then the cooling airstream flows through the gap between the rotor and stator and through an intermediate chamber situated directly behind the rotor back into the rear chamber of the housing, from where the air is blown out into the open atmosphere. Since, with such a small motor, the entrance of the cooling air into the motor housing takes place at a radius large than the discharge of the air from the gap between the rotor and stator, the stream of heated cooling air flowing out from the motor at the outer circumferential region of the rotor into the outer atmosphere must cross the cooling air which flows into the motor, so that it becomes necessary to avoid a direct collision between these two air streams.

These requirements are fulfilled with such small motors by a special arrangement of disturbing systems. In one special distributing body there are a pair of these systems which include oppositely twisted passages with the passages of one of the systems extending substantially parallel to the rotor axis while the passages of the second system include inclined bores which are required to be precisely aligned with inclined outlets in the motor housing. Such a distributing body is of considerable complexity, and the manufacture thereof, when considering the small size, is neither easy nor simple. The assembly of parts is difficult particularly with respect to the fitting of the inclined passages of the above second system so that they communicate properly with the corresponding inclined openings in the motor housing. A further difficulty of such a construction results from the fact that the distributing body must be seated in an airtight manner not only at the front end of the stator but also at the outer surface of the stator or at the motor housing.

SUMMARY OF THE INVENTION

It is accordingly a primary object of the present invention to provide a construction which will avoid all the above drawbacks.

In particular, it is an object of the invention to provide a construction maintaining all of the advantages of the known structures while at the same time replacing the complex, known distributing bodies with a relatively simple structure at the motor housing.

Thus, it is an object of the invention to provide a relatively inexpensive structure of easily assembled components, which do not require the precision of the known structures or the complexity thereof, while at the same time being capable of achieving a highly effective cooling of a relatively small motor of the type suitable for use with dental equipment.

In accordance with the invention the motor housing accommodates in its interior a stator and rotor which define between themselves a gap having a front end and a rear end. The housing has a front chamber communicating with the front end of this gap and a rear chamber communicating with the rear end of this gap, and a partition means extends across the interior of the housing to close the rear interior chamber thereof. This housing is formed at its exterior with an inlet passage communicating with a space in the housing at the rear of the partition thereof and also communicating with the front chamber so that colling air can enter through this inlet passage into the front chamber of the housing to communicate with the front end of the gap. The rear chamber communicates with an outlet passage which has an outlet and communicating freely with the outer atmosphere, so that after the cooling air flows rearwardly through the gap into the rear chamber it can flow out through the outlet passage to the outer atmosphere. These passages preferably take the form of grooves and portions of reduced diameter at least partly closed by a sleeve which surrounds and is seated on the housing.

BRIEF DESCRIPTION OF DRAWINGS

The invention is illustrated by way of example in the accompanying drawings which form part of this application and in which:

FIG. 1 is a longitudinal partly sectional illustration of a motor according to the invention, the section of FIG. 1 being taken in a plane which contains the axis of the motor, and FIG. 1 showing both the rotor and the commutator of the motor;

FIG. 2 is a transverse section taken along line 2-2 of FIG. 1 in the direction of the arrows;

FIG. 3 is a transverse section taken along line 3—3 of FIG. 1 in the direction of the arrows;

FIG. 4 is a transverse selection taken along line 4—4 of FIG. 1 in the direction of the arrows; and FIG. 5 is a rear end view of the motor of FIG. 1 taken in the direction of the arrow 5.

DESCRIPTION OF PREFERRED EMBODIMENTS

Referring now to the drawings, the small electric motor illustrated therein includes a rotor 10 partly supported for free rotary movement by way of a front bearing 15 and including a stator 20 made of permanent magnets. These components, namely the rotor 10, the front bearing 15, and the stator 20 are omitted from FIGS. 2—5 for the sake of clarity. The rotor 10 is fixedly carried by the rotatable motor shaft 11 on which the commutator 12 is also mounted, and a rear bearing 16 coacts with the front bearing 15 to support the shaft 11 and the rotor 10 and the commutator 12 for free rotary movement. The permanent magnets which make up the stator 20 are carried by the motor housing 30 in the interior thereof.

This motor housing 30 has a forward portion of reduced outer diameter and a rear portion 39 of larger diameter separated from the portion 31 by the inclined shoulder visible in FIG. 1.

Inlet and outlet passage systems are formed in the motor housing. The inlet passage system includes at least one inlet passage having a groove extending axially along the larger housing portion 39. In the illustrated example, the inlet passage has a plurality of these grooves which alternate with grooves which form the outlet passage. Thus, the inlet passage system includes axially extending grooves 32a, 32b and 32c which extend all the way up to and communicate with the front elongated housing portion 31 of the reduced diameter. At their rear ends, these grooves 32a, 32b and 32c respectively communicate through openings 34a, 34b and 34c (FIG. 2) with the rear interior housing space A which communicates, for example, with a source of cooling air such as a source of compressed air which flows from the space A through the rear openings of the inlet passages into the grooves 32a, 32b and 32c so as to reach the annular housing portion 31. A partition means 60 extends across the interior of the housing to close off the rear chamber D from the rear space A of the motor, this chamber D accommodating the commutator 12.

The outlet passage includes axially extending grooves 33a, 33b and 33c which respectively alternate with the inlet grooves 32a, 32b and 32c and which terminate at their front ends in the openings 36a, 36b and 36c which communicate only with the rear interior housing chamber D, since these front openings of the outlet passages are situated to the rear of the reduced housing portion 31. At their rear ends, the outlet passages 33a, 33b and 33c communicate with outlet openings 37a, 37b and 37c which freely communicate with the outer atmosphere.

The elongated annular housing portion 31 of reduced diameter is formed at the region of its front end with openings 35a, 35b and 35c (FIG. 4) which provide communication between the space surrounding the housing portion 31 and the front end chamber B in the interior of the motor housing, this front chamber B communicating with the front end of the gap C between the rotor and stator while the rear end of this latter gap freely communicates with the rear chamber D. This front chamber B is defined in part, at its front end, by a front bearing support wall 50 which carries the bearing 15.

The passages formed at the exterior of the housing 30 are closed, in part by way of an outer sleeve 40 which at its rear end is seated on a shoulder provided at the rear portion of the larger diameter part 39 of the hosing 30. The rear end of the sleeve 40 terminates ahead of the rear end of the housing 30, so as to provide the free spaces E forming the rear outlets 37a, 37b, 37c of the outlet passages 33a, 33b, 33c respectively. This sleeve 40 is initially placed on the housing 30 in engagement with the rear shoulder thereof, and then a ring 51, which forms part of the front wall 50, is situated between the front end of the sleeve 40 and the housing 30, forwardly of the openings 35a, 35b, 35c, this ring 51 having a shoulder on which the front end of the sleeve 40 is seated in the manner shown most clearly in FIG. 1. In this way the small diameter portion 31 of the housing 30 and the sleeve 40 define between themselves an interior annular space which forms part of the inlet passage, communicating with the grooves 32a, 32b, 32c, thereof as well as the openings 35a, 35b, 35c. The motor housing carries a front cover 13 forming with the ring 51, part of the wall assembly 50 which carries the bearing 15, and the motor shaft 11 extend forwardly beyond the space which is closed off by the front wall 13.

The rear bearing 16 is carried by an insert 62 of the rear partition means 60. This rear partition means 60 has an outer flange 61 engaging an inner, rearwardly directed shoulder of the housing, and a ring 70 is threaded, for example, into the interior of the housing to hold the partition 60 in the location thereof shown in FIG. 1. The threads at the interior of the housing serve not only to accommodate the holding ring 70 but also to connect to the rear of the housing a fitting to connect the space A with a source of compressed air, and also the fitting can serve to hold the electrical leads which direct the electrical energy to and from the motor.

The partition 60 serves to carry spring-pressed brushes 65 which on the one hand engage the commutator 12 and on the other hand are connected with electrical contacts 66. The ends of the current conductor are connected with the contacts 66 in a well-known manner.

The compressed cooling air which is delivered to the rear space A flows around the partition 60 through the openings 34a, 34b, 34c into the inlet passage along the grooves 32a, 32b, 32c thereof into the chamber defined the sleeve 40 and the reduced diameter housing portion 31, the air flowing at this time in the direction of the arrow 5 shown in FIG. 1. In this way the cooling air reaches the openings 35a, 35b, 35c so as to flow into the front chamber B where the cooling air reverses its direction, so as to flow in a direction opposite of that indicated by the arrow 5. Now the cooling air will flow through the gap C between the rotor 10 and the stator 20 so as to reach the rear interior chamber D. The heated air can now flow out through the openings 36a, 36b, 36c of the outlet passage into the grooves 33a, 33b, 33c thereof to reach the outlet openings 37a, 37b, 37c so as to discharge freely to the outer atmosphere.

It will be noted that in this way the stream of cooling air does not at any time come into undesired contact with the hand which engages the exterior surface of the sleeve 40 of the motr. The cooling air stream is surprisingly effective since the sleeve 40 is the first part of the motor which comes into contact with the cooling air which is initially supplied to the motor.

The construction of this motor of the invention as a unit is considerably simplified with the features of the invention. The individual parts are easily manufactured and the assembly does not require any special precautions since all of the openings and grooves of the inlet and outlet passages are formed in one single body, namely the housing 30. It is therefore unnecessary to bring different grooves, openings, and the like into precise alignment with each other, as is the case when several different bodies respectively carry parts of the inlet and outlet passages and must be precisely assembled with each other.

What I claim is:

1. In a small electric motor, of the type used for dental equipment and the like, a rotor and stator defining between themselves an axially extending annular gap having a front end and a rear end, a housing having an interior accommodating said rotor and stator, said housing having a front chamber communicating with the front end of said gap and a rear chamber communicating with the rear end of said gap, partition means carried by and extending across the interior of said housing for closing said rear chamber and for providing on the side of said partition means opposite from said rear chamber a housing space for communicating with a source of compressed air, said housing being formed at its exterior, which is directed away from its interior, with at least one inlet passage communicating with said housing space and leading therefrom toward and communicating with said front chamber, and said housing also being formed at its exterior with at least one outlet passage having a front end communicating only with said rear chamber of said housing and having a rear end communicating freely with the outer atmosphere, and a closure sleeve carried by and surrounding said housing and closing said passages, except for said rear end of said outlet passage which communicates freely with the outer atmosphere, whereby cooling air can enter through said housing space into said inlet passage to flow therealong into the front end of said chamber where the cooling air reverses its direction and flows rearwardly through said gap between said rotor and stator into said rear chamber and from the latter into said outlet passage to flow therethrough to the outer atmosphere.

2. The combination of claim 1 and wherein said housing is formed with an annular portion of reduced outer diameter situated forwardly of said outlet passage and forming part of said inlet passage, said housing being formed at a front end region of said reduced diameter portion thereof with at least one opening providing communication between said inlet passage and said front chamber, and said inlet passage including an elongated groove formed in said housing extending rearwardly from said annular portion of reduced diameter thereof and communicating at its rear end with said housing space at the side of said partition means opposite from said rear chamber.

3. The combination of claim 2 and wherein said inlet passage includes a plurality of said grooves extending rearwardly from said portion of reduced diameter and distributed about the axis of said housing.

4. The combination of claim 3 and wherein said outlet passage includes a plurality of outlet grooves formed in said housing, distributed about said axis thereof, and respectively alternating with said grooves of said inlet passage.

5. The combination of claim 4 and wherein said housing is formed rearwardly of said inlet passage with a shoulder seating said closure sleeve.

6. The combination of claim 5 and wherein said housing carries at a front end region a ring supporting said sleeve at a front end region of the latter and closing the front end of said inlet passage.

7. The combination of claim 6 and wherein a bearing means supports said rotor for rotation at a rear end thereof and is carried by said partition means.

8. The combination of claim 1 and wherein a bearing means supports said rotor at a rear end thereof for free rotary movement and is carried by said partition means.